(12) United States Patent
Amada et al.

(10) Patent No.: US 7,936,492 B2
(45) Date of Patent: May 3, 2011

(54) LIGHT SOURCE DEVICE, OPTICAL SCANNING DEVICE, AND IMAGE FORMING APPARATUS

(75) Inventors: Taku Amada, Kanagawa (JP); Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 506 days.

(21) Appl. No.: 12/051,404

(22) Filed: Mar. 19, 2008

(65) Prior Publication Data

US 2008/0239433 A1 Oct. 2, 2008

(30) Foreign Application Priority Data

Mar. 28, 2007 (JP) ................................. 2007-084168

(51) Int. Cl.
*G02B 26/08* (2006.01)
(52) U.S. Cl. .................. 359/196.1; 359/197.1; 359/822; 347/257
(58) Field of Classification Search .... 359/196.1–226.2, 359/811, 813–814, 819–820, 822–824, 826–827; 362/296.09–296.1; 347/242, 257
See application file for complete search history.

(56) References Cited

U.S. PATENT DOCUMENTS

| | | | |
|---|---|---|---|
| 4,853,710 A | 8/1989 | Shimada et al. | |
| 5,633,744 A | 5/1997 | Nakajima | |
| 5,671,077 A | 9/1997 | Imakawa et al. | |
| 5,753,907 A | 5/1998 | Nakajima et al. | |
| 5,786,594 A | 7/1998 | Ito et al. | |
| 5,793,408 A | 8/1998 | Nakajima | |
| 5,936,756 A | 8/1999 | Nakajima | |
| 5,952,649 A | 9/1999 | Amada | |
| 5,999,345 A | 12/1999 | Nakajima et al. | |
| 6,052,211 A | 4/2000 | Nakajima | |
| 6,091,534 A | 7/2000 | Nakajima | |
| 6,621,512 B2 | 9/2003 | Nakajima et al. | |
| 6,657,765 B2 | 12/2003 | Hayashi et al. | |
| 6,771,300 B2 | 8/2004 | Amada et al. | |
| 6,775,041 B1 | 8/2004 | Nakajima | |
| 6,839,157 B2 | 1/2005 | Ono et al. | |
| 6,932,271 B2 | 8/2005 | Nakajima et al. | |
| 6,972,883 B2 | 12/2005 | Fujii et al. | |
| 6,995,885 B2 | 2/2006 | Nakajima | |
| 7,050,082 B2 | 5/2006 | Suzuki et al. | |
| 7,068,296 B2 | 6/2006 | Hayashi et al. | |
| 7,075,688 B2 | 7/2006 | Nakajima | |
| 7,145,589 B2 | 12/2006 | Amada et al. | |
| 7,170,660 B2 | 1/2007 | Nakajima | |
| 7,206,014 B2 | 4/2007 | Amada et al. | |
| 7,221,493 B2 | 5/2007 | Fujii et al. | |
| 7,333,254 B2 | 2/2008 | Amada et al. | |

(Continued)

FOREIGN PATENT DOCUMENTS

JP 8-330661 12/1996

(Continued)

*Primary Examiner* — James Phan
(74) *Attorney, Agent, or Firm* — Oblon, Spivak, McClelland, Maier & Neustadt, L.L.P.

(57) ABSTRACT

An optical splitting member splits a light beam emitted by a light source into first light beam and second light beam. A coupling member couples the first light beam. An optical system converges the second light beam on a light receiving unit. A holding member holds the light source, the optical splitting member, the coupling member, and the optical system. A supporting member supports the holding member so that the holding member is rotatable about an optical axis of the light beam.

14 Claims, 8 Drawing Sheets

U.S. PATENT DOCUMENTS

| | | |
|---|---|---|
| 2002/0122217 A1 | 9/2002 | Nakajima |
| 2003/0053156 A1 | 3/2003 | Satoh et al. |
| 2004/0036936 A1 | 2/2004 | Nakajima et al. |
| 2004/0184127 A1 | 9/2004 | Nakajima et al. |
| 2005/0024479 A1 | 2/2005 | Itabashi et al. |
| 2005/0062836 A1 | 3/2005 | Nakajima |
| 2005/0105156 A1* | 5/2005 | Ono et al. .................. 359/204 |
| 2005/0179971 A1 | 8/2005 | Amada et al. |
| 2005/0185237 A1 | 8/2005 | Nakajima |
| 2005/0190420 A1 | 9/2005 | Imai et al. |
| 2005/0243396 A1 | 11/2005 | Fujii et al. |
| 2006/0012844 A1 | 1/2006 | Fujii et al. |
| 2006/0028533 A1 | 2/2006 | Nakajima |
| 2006/0132880 A1 | 6/2006 | Amada et al. |
| 2006/0158711 A1 | 7/2006 | Imai et al. |
| 2006/0209166 A1 | 9/2006 | Suzuki et al. |
| 2006/0232660 A1 | 10/2006 | Nakajima et al. |
| 2006/0232844 A1 | 10/2006 | Nakajima |
| 2006/0238845 A1 | 10/2006 | Atsuumi et al. |
| 2006/0245009 A1 | 11/2006 | Akiyama et al. |
| 2007/0035796 A1 | 2/2007 | Nakajima |
| 2007/0058232 A1 | 3/2007 | Nakajima |
| 2007/0058255 A1 | 3/2007 | Imai et al. |
| 2007/0081152 A1 | 4/2007 | Amada |
| 2007/0097474 A1 | 5/2007 | Amada et al. |
| 2007/0146738 A1 | 6/2007 | Nakajima |
| 2007/0146851 A1 | 6/2007 | Nakajima |
| 2007/0146856 A1 | 6/2007 | Nakajima |
| 2007/0189008 A1 | 8/2007 | Amada et al. |
| 2007/0206259 A1 | 9/2007 | Nakajima |
| 2008/0024590 A1 | 1/2008 | Nakajima |

FOREIGN PATENT DOCUMENTS

| | | |
|---|---|---|
| JP | 2908652 | 4/1999 |
| JP | 2908657 | 4/1999 |
| JP | 2006-88569 | 4/2006 |
| JP | 2006-91157 | 4/2006 |
| JP | 2006-179769 | 7/2006 |

* cited by examiner

LIGHT SOURCE DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese priority document 2007-084168 filed in Japan on Mar. 28, 2007.

BACKGROUND OF THE INVENTION

1. Field of the Invention

The present invention relates to a light source device, an optical scanning device, and an image forming apparatus.

2. Description of the Related Art

In an image forming apparatus employing the Carlson process, for example, the surface of a rotating photosensitive drum is scanned by a light beam thereby forming an electrostatic latent image on the surface of the photosensitive drum. The electrostatic latent image is then developed into a visible image, i.e., a toner image, and the toner image is transferred onto a recording medium and fixed thereon. This type of image forming apparatus is often employed as an on-demand printing system for simple printing, and there is an increasing demand for a system capable of outputting a high-density image at high speed.

To satisfy such a demand, for example, Japanese Patent Application Laid-open No. 2006-88569 discloses an image forming apparatus including a light source, such as a surface emitting laser array (vertical cavity surface emitting laser (VCSEL)) that includes a plurality of light emitters, emits a plurality of light beams that simultaneously scan a plurality of scan lines on a scan surface. However, because the light emitters are two-dimensionally arranged in a monolithic manner, for example, density variation may be disadvantageously caused due to variation in the distance between adjacent beam spots formed on the scan surface and variation in the shape of the beam spots.

One approach to reduce such density variation is to adjust a relative position of an optical system and the light source. However, change in the relative position of the optical system and the light source changes intensity (light amount) of the light beam emitted from the light source and a relative position of the light source and a light receiving unit that monitors the light amount. If an intensity of the light beam emitted from the light source, or a relative position of the light source and a light receiving unit changes, the light receiving unit cannot detect the light beam accurately, which results in unequal outputs of the light emitters. This leads to quality deterioration of an image output such as density variation. Therefore, it is also required to perform optical initial adjustment such as optical axis adjustment between the light receiving unit and the light source. Such inconvenience also occurs when the light source is replaced.

Because the VCSEL (surface emitting laser) emits the light beams in a single direction perpendicular to an active layer, the light amount cannot be controlled by simple monitoring of the amount of light emitted backward, which is performed in an edge emitting laser. For example, Japanese Patent Application Laid-open No. H8-330661 discloses a light detecting device including a beam splitter fixed to a surface emitting laser. The beam splitter splits light beams emitted by the surface emitting laser such that a part of the light beams is deflected to and detected by a light detecting unit. However, because the beam splitter splits a flux of light beams, efficiency of using the light decreases. In addition, use of a beam splitter increases the cost. Japanese Patent Application Laid-open No. 2006-179769 discloses a semiconductor laser including a window that splits light beams emitted by a laser chip and a photodiode that is arranged outside an area of light beams passing through the window and that monitors a light amount. However, because elements and a pattern of the photodiode need to be arranged in a narrow area, it is difficult to manufacture such a semiconductor laser.

Because light beams emitted from light emitters formed on a VCSEL are modulated independently based on image data, it is required to individually control outputs (light amount) of the light emitters based on a result of detecting the light beams by a light receiving unit.

SUMMARY OF THE INVENTION

It is an object of the present invention to at least partially solve the problems in the conventional technology.

According to an aspect of the present invention, there is provided a light source device that includes a light source that emits a light beam; an optical splitting member that splits the light beam into a first light beam and a second light beam; a coupling member that couples the first light beam; a light receiving unit; an optical system including a converging member that converges the second light beam on the light receiving unit; a holding member that holds the light source, the optical splitting member, the coupling member, and the optical system in a predetermined relation; and a supporting member that supports the holding member such that the holding member is rotatable about an optical axis of the light beam.

According to another aspect of the present invention, there is provided an optical scanning device that includes a light source including a light source that emits a light beam; an optical splitting member that splits the light beam into a first light beam and a second light beam; a coupling member that couples the first light beam; a light receiving unit; an optical system including a converging member that converges the second light beam on the light receiving unit; a holding member that holds the light source, the optical splitting member, the coupling member, and the optical system in a predetermined relation; and a supporting member that supports the holding member such that the holding member is rotatable about an optical axis of the light beam; a deflecting unit that deflects the first light beam; and an optical scanning system that focuses the first light beam deflected by the deflecting unit on a scan target surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
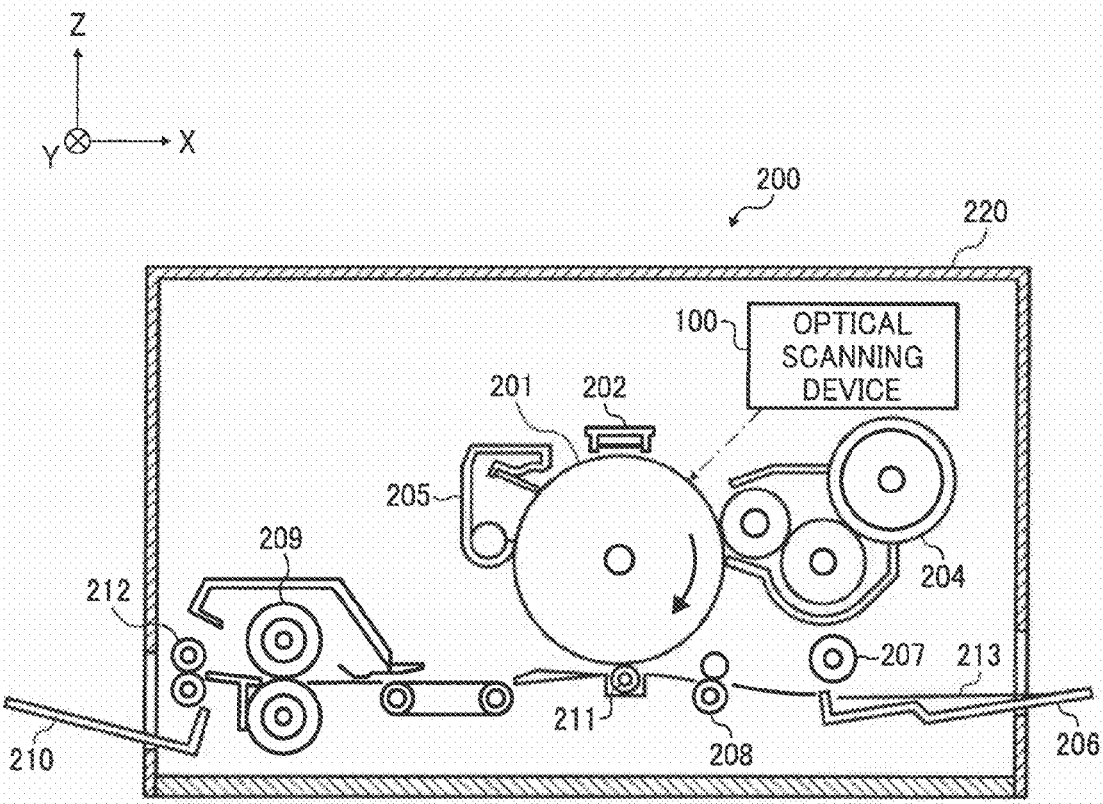
FIG. 1 is a schematic diagram of an image forming apparatus according an embodiment of the present invention.

An image forming apparatus 200 according to an embodiment of the present invention is explained in detail below with reference to FIGS. 1 to 10. FIG. 1 is a schematic diagram of the image forming apparatus 200.

The image forming apparatus 200 is a printer employing the Carlson process in which an image is printed by transferring a toner image onto a recording medium (sheet). As shown in FIG. 1, the image forming apparatus 200 includes an optical scanning device 100, a photosensitive drum 201, a charger 202, a toner cartridge 204, a cleaner housing 205, a feed tray 206, a feeding roller 207, a pair of registration rollers 208, a transfer charger 211, a pair of fixing rollers 209, a pair of ejecting rollers 212, an eject tray 210, and a housing 220 that houses therein the above units.

The housing 220 is substantially rectangular cubical and it has two side walls: a +X-side wall and a −X-side wall. An opening that provides communication between inside and outside the housing 220 is formed on each of the side walls. Incidentally, side or direction opposite to that indicated by "X" (hereinafter, "+X") in the drawings is hereinafter represented by "−X". The −X direction and the +X direction can be collectively referred to as "X direction". The same applies to "Y" and "Z".

The optical scanning device 100 is positioned in an upper space in the housing 220 and it deflects a light beam modulated based on image information in a main scanning direction (a Y direction) so that the light beam scans a surface of the photosensitive drum 201 (i.e., scan target surface).

The photosensitive drum 201 is cylindrical and it includes a photosensitive layer (not shown) as its surface that, when irradiated with a light beam, becomes conductive. The photosensitive drum 201 is positioned below the optical scanning device 100 such that its longer side extends in the Y direction. The photosensitive drum 201 is driven, or rotated, by a rotating unit (not shown) clockwise as indicated by an arrow shown in FIG. 1. The charger 202, the toner cartridge 204, the transfer charger 211, and the cleaner housing 205 are positioned around the photosensitive drum 201.

The charger 202 is positioned above the photosensitive drum 201 with a clearance in between. The charger 202 charges the surface of the photosensitive drum 201 with a predetermined voltage.

The toner cartridge 204 includes a toner container filled with toner, and a developing roller that is charged with a voltage having a polarity opposite to that of the photosensitive drum 201. The toner in the toner container is electrostatically supplied to the surface of the photosensitive drum 201 via the developing roller.

The cleaner housing 205 includes a rectangle cleaning blade positioned such that its longitudinal direction extends in the Y direction. One end of the cleaning blade abuts with the surface of the photosensitive drum 201. The toner adhered to the surface of the photosensitive drum 201 is removed by the cleaning blade with rotation of the photosensitive drum 201 and is collected in the cleaner housing 205.

A certain clearance, i.e. a nip, is present between the transfer charger 211 and the surface of the photosensitive drum 201. The transfer charger 211 is charged with a voltage having a polarity opposite to that of the photosensitive drum 201.

The feed tray 206 is positioned such that its one end protrudes out of the housing 220 through the opening on the +X-side wall. The feed tray 206 is capable of holding a plurality of sheets 213.

The feeding roller 207 guides the sheets 213 from the feed tray 206 one by one to the nip between the photosensitive drum 201 and the transfer charger 211 via the registration rollers 208.

The fixing rollers 209 heats and pressurizes the sheet 213, and guide the sheet 213 to the ejecting rollers 212.

The ejecting rollers 212 eject the sheets 213 conveyed from the fixing rollers 209 one by one to the eject tray 210, so that the sheets 213 are sequentially stacked on the eject tray 210. One end of the eject tray 210 protrudes out of the housing 220 through the opening on the −X-side wall.

Figure 2:
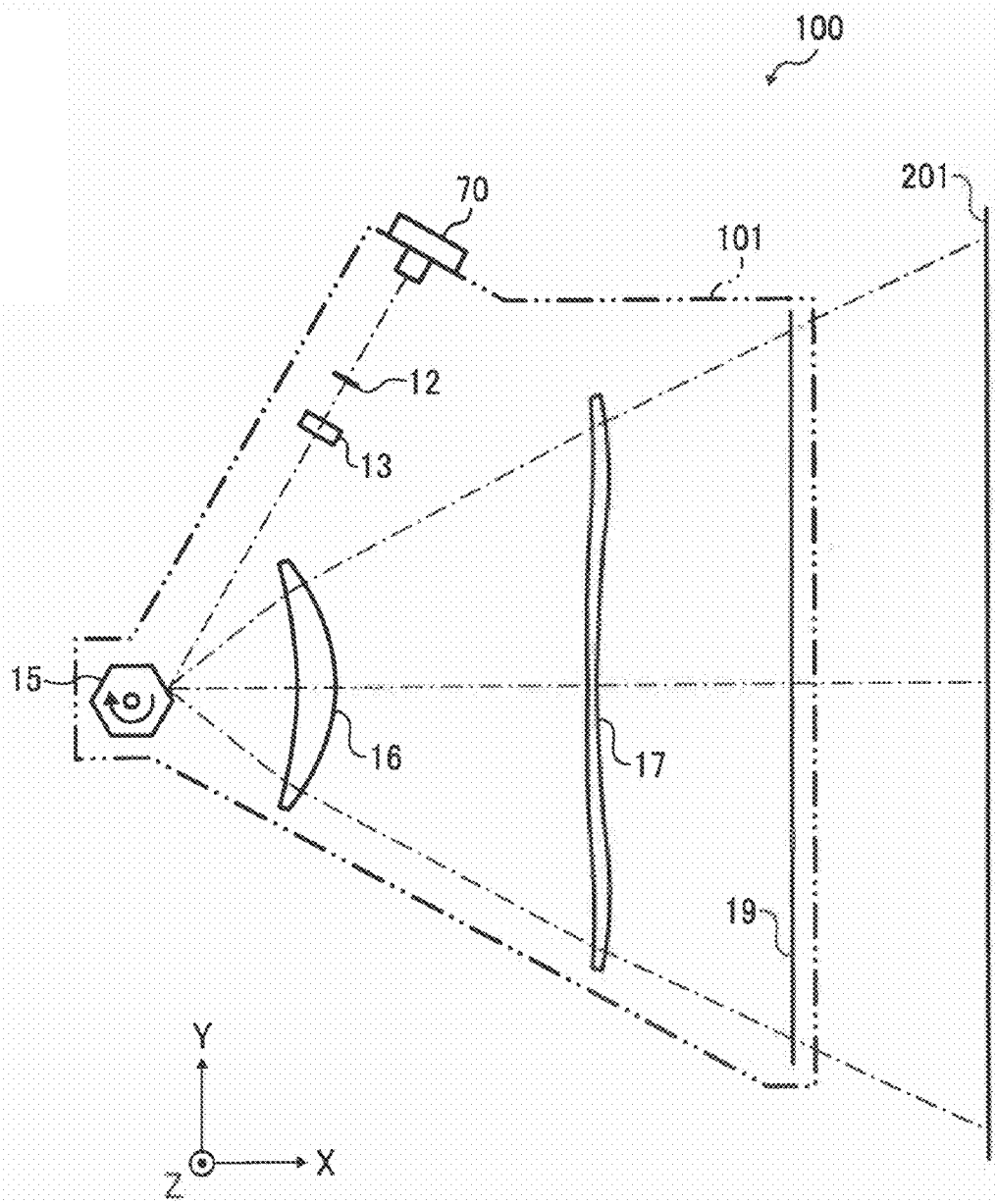
FIG. 2 is an overhead view of an optical scanning device shown in FIG. 1.

The structure of the optical scanning device 100 is explained in detail with reference to FIG. 2. FIG. 2 is an overhead view of the optical scanning device 100. The optical scanning device 100 includes an optical system and a housing 101 that houses therein the optical system. The optical system includes a light source device 70 that emits a plurality of light beams, an aperture member 12, a linear-image forming lens 13, a polygon mirror 15, a first scanning lens 16, a second scanning lens 17, and the mirror 19. The aperture member 12, the linear-image forming lens 13, and the polygon mirror 15 are arranged on a line extending from the light source device 70 and having an angle of 60 degrees with respect to an X axis. The first scanning lens 16, the second scanning lens 17, and the mirror 19 are arranged on the +X side of the polygon mirror 15.

The aperture member 12 has an aperture having a width in an X-axis direction of, for example, 5.5 millimeters, a length in the Z-axis direction (sub scanning direction) of, for example, 1.18 millimeters. The center of the aperture is positioned on or near a focal point of a coupling lens 11 of the light source device 70 (see FIG. 7).

The linear-image forming lens 13 is a cylindrical lens having a surface with refractivity in the Z-axis direction (sub scanning direction). The linear-image forming lens 13 converges light beams having passed through the aperture member 12 on a deflecting surface of the polygon mirror 15.

The polygon mirror 15 is a cylinder member having polygonal top and bottom surfaces and six deflecting surfaces on its sides. The polygon mirror 15 is rotated by a rotating mechanism (not shown) in a direction indicated by an arrow shown in FIG. 2 at a predetermined angular velocity. Thus, a light beam incident on the polygon mirror 15 is deflected by a deflecting surface of the polygon mirror 15 in a Y-axis direction.

The first scanning lens 16 and the second scanning lens 17 cooperatively focus the light beam deflected by a deflecting surface of the polygon mirror 15 into a beam spot on the surface of the photosensitive drum 201 via the mirror 19. In this manner, the surface of the photosensitive drum 201 is scanned with the beam spot in the main scanning direction (Y-axis direction) at a constant rate.

Figure 3A:
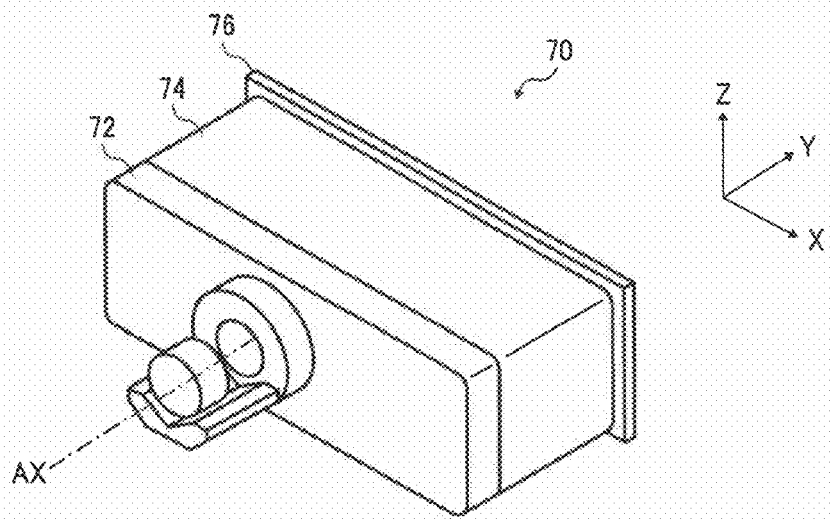
FIG. 3A is a perspective view of a light source device shown in FIG. 2.
Figure 3B:
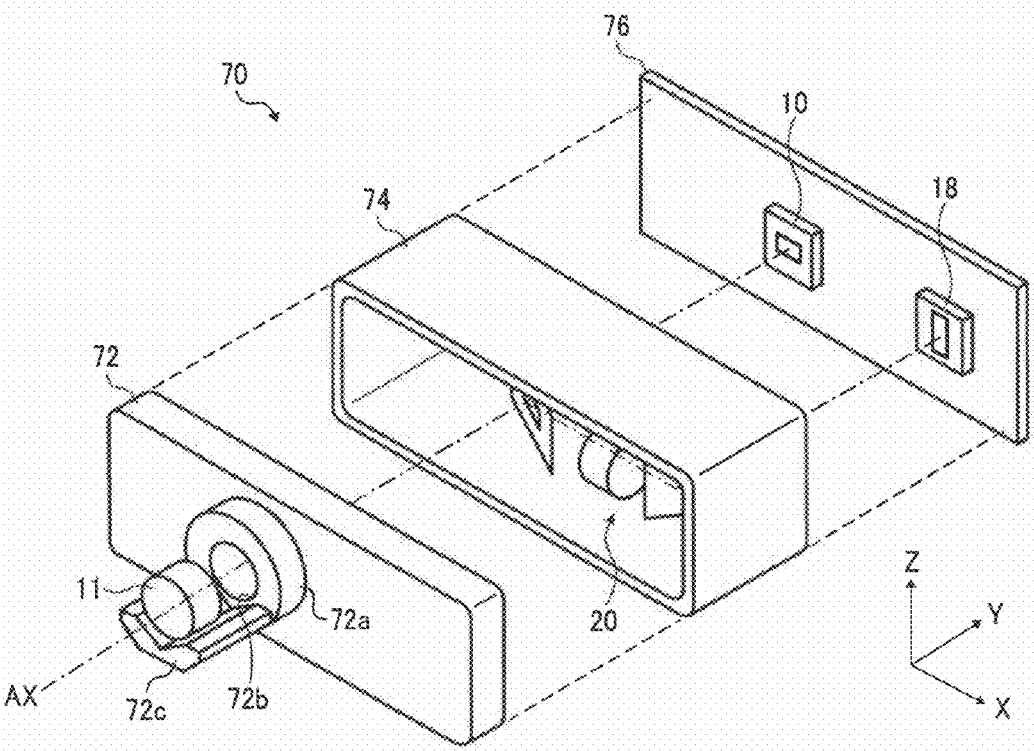
FIG. 3B is an exploded perspective view of the light source device shown in FIG. 3A.

As shown in FIG. 2, the light source device 70 is attached to an external surface of the housing 101. FIG. 3A is a perspective view of the light source device 70 and FIG. 3B is an exploded perspective view of the light source device 70. As shown in FIGS. 3A and 3B, the light source device 70 includes a substrate 76 on which a light source 10 and a light receiving unit 18 are mounted, a first holder 74 that holds a light guiding system 20, a second holder 72 that holds the coupling lens 11.

The substrate 76 has its longitudinal direction in the X-axis direction. For example, a drive circuit (not shown) for driving the light source 10 and a monitor circuit (not shown) for monitoring a signal output from the light receiving unit 18 are arranged on front (+Y-side) and back (−Y-side) surfaces of the substrate 76. The light source 10 and the light receiving unit 18 are mounted on a −Y-side surface of the substrate 76.

Figure 4:
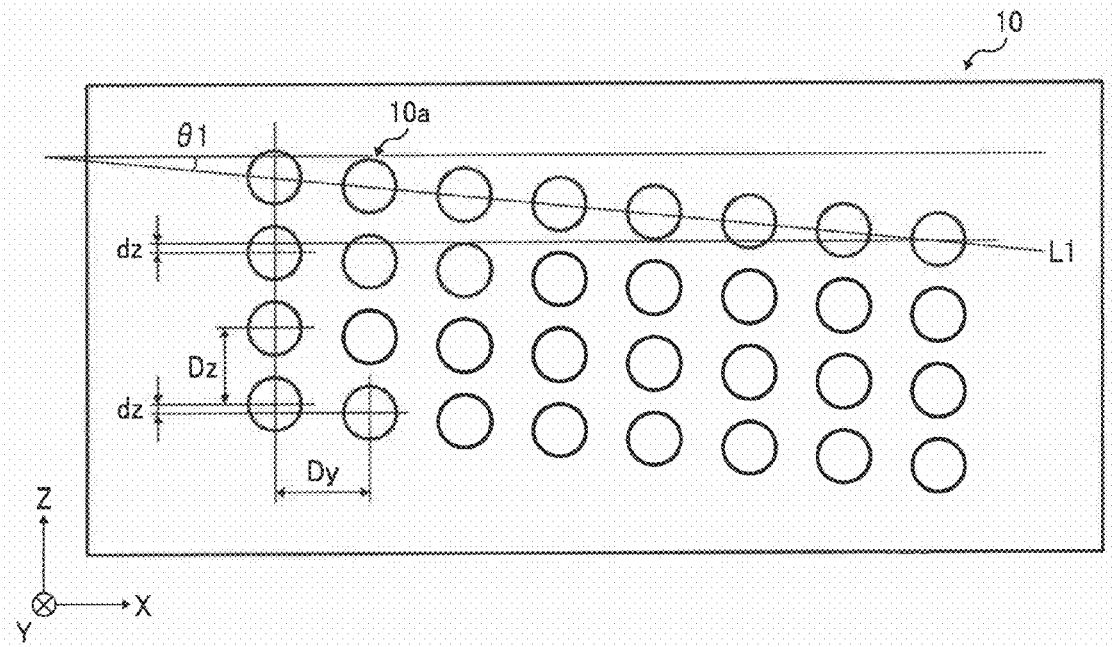
FIG. 4 is a plan view of a light source shown in FIG. 3B.

The light source 10 is a surface emitting semiconductor laser array including a two-dimensional array of light emitters. Each of the light emitters emits a divergent light. Specifically, a surface-emitting laser array chip is mounted on a flat package having a rectangular shape. As shown in FIG. 4, for example, 32 light emitters 10a are arranged in a matrix of four rows and eight columns on a −Y-side surface of the flat package. Specifically, eight light emitters 10a are arranged in each row in a direction parallel to a line L1 having an angle of θ1 with respect to the x axis and four light emitters 10a are arranged in each column in a direction parallel to the Z axis direction. For example, a distance Dz between adjacent light emitters 10a in the sub scanning direction is 18.4 micrometers, a distance Dy between adjacent light emitters 10a in the main scanning direction is 30.0 micrometers, and a distance dz between adjacent light emitters 10a with respect to the Z-axis direction (sub scanning direction) is 2.3 micrometers (=Dz/8).

The light receiving unit 18 is arranged on the +X side of the light source 10 and it outputs a signal (photoelectrically-converted signal) corresponding to an intensity of the light beam incident on the light receiving unit 18.

The first holder 74 is a frame member that has open sides on the +Y side and a −Y side. The light guiding system 20 is housed in the first holder 74.

Figure 5:
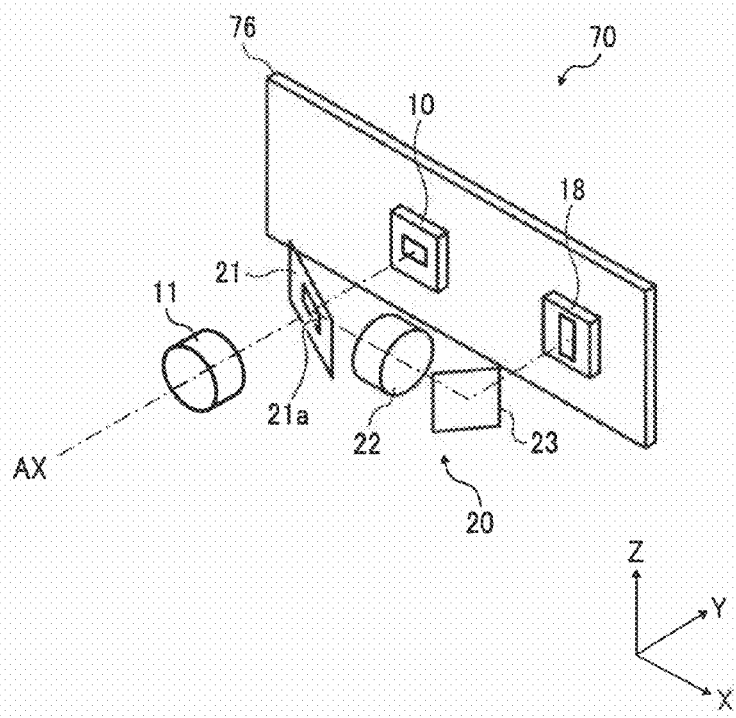
FIG. 5 is another exploded perspective view of the light source device.

FIG. 5 is a perspective view of the light source device 70. For convenience, the first holder 74 and the second holder are not shown in FIG. 5. The light guiding system 20 includes an optical splitter 21, a converging lens 22, and a mirror 23 that are supported by the first holder 74 via a supporting member (not shown).

The optical splitter 21 is a plate-shaped member having a rectangular opening 21a in its center, and has a reflecting surface on a side of the light source 10 for reflecting a light beam. The optical splitter 21 is held on an axis parallel to the Z axis at an angle of 45 degrees with respect to the Y axis. A part of the light beam incident on the surface of the optical splitter 21 from the +Y side passes through the opening 21a, and the rest of the light beam is deflected in the +X direction.

The converging lens 22 has a positive power and it converges the light beams deflected by the optical splitter 21 in the +X direction on an incident surface of the light receiving unit 18 via the mirror 23.

As shown in FIG. 3B, the second holder 72 includes a plate-shaped body unit having an opening 72b formed in its center, an annular protruding member 72a that surrounds the opening 72b, and a lens supporting member 72c that extends from a bottom portion of the annular protruding member 72a in the −Y direction. A V-shaped groove is formed in the Y-axis direction on an upper surface of the lens supporting member 72c. The coupling lens 11 is supported by the lens supporting member 72c while the position of the coupling lens 11 in the X-axis direction and the Z-axis direction is regulated by the V-shaped groove. The adjustment of the position of the light source 10 and the coupling lens 11 (optical axis collimation adjustment) is explained in detail below, assuming that the cross section of the lens supporting member 72c has an arc portion.

The coupling lens 11 has a refractivity of about 1.5 and it couples light beams emitted by the light source 10.

Figure 6A:
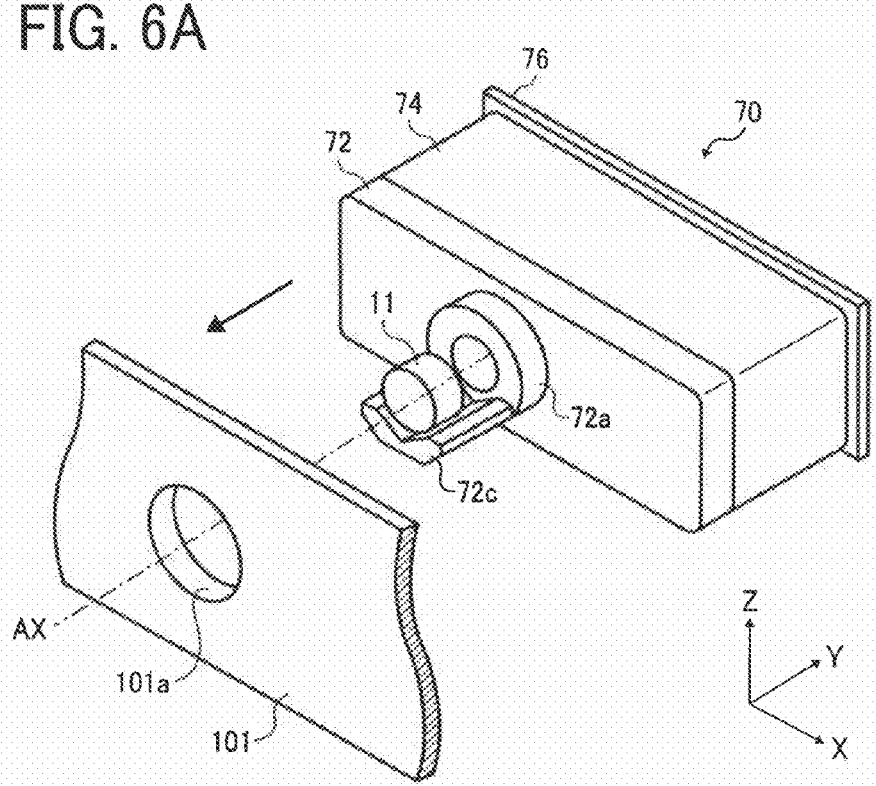
FIGS. 6A and 6B are perspective views of the light source device and a housing shown in FIG. 2 for explaining how the light source device is attached to the housing.
Figure 6B:
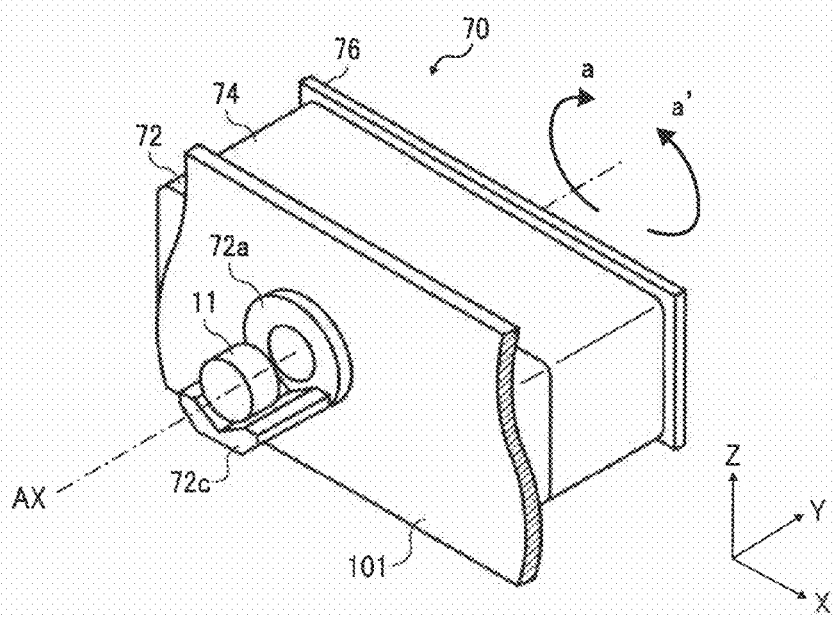

The substrate 76, the first holder 74, and the second holder 72 are integrated. Specifically, a periphery of the −Y-side surface of the substrate 76 and a periphery of a +Y-side of the first holder 74 are fit to each other, and a periphery of a −Y-side of the first holder 74 and a periphery of a +Y-side surface of the second holder 72 are fit to each other. As shown in FIGS. 6A and 6B, the light source device 70 is attached to the external surface of the housing 101. Specifically, the housing 101 has a circular opening 101a, and the annular protruding member 72a of the light source device 70 is inserted into and fitted to this circular opening 101a. Moreover, as shown in FIG. 6B, the light source device 70 is rotatable about an axis AX. It is possible to adjust a pitch of light beams to be converged on the photosensitive drum 201 via an optical path from the aperture member 12 to the photosensitive drum 201 to a predetermined value by rotating the light source device 70.

Figure 7:
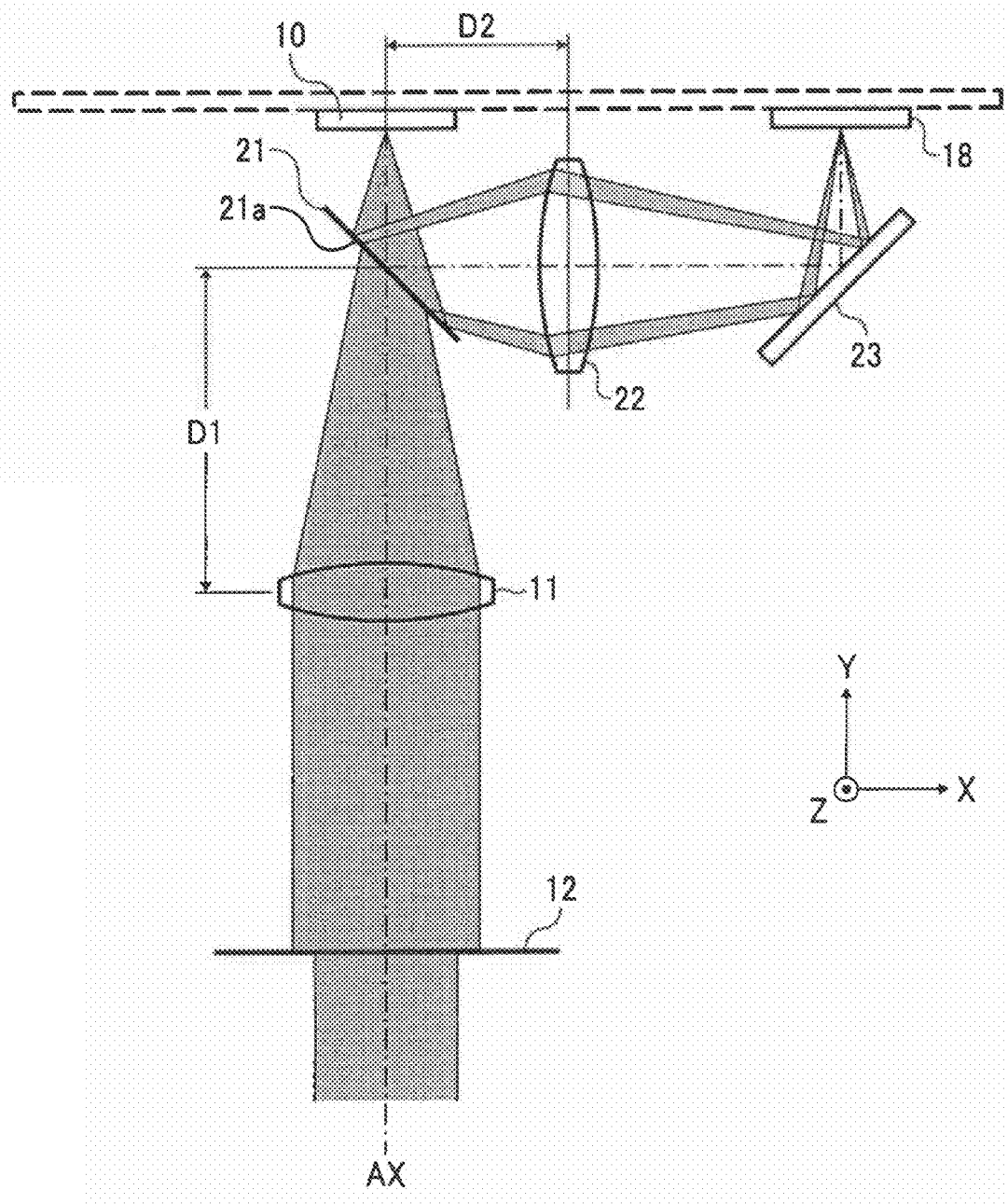
FIG. 7 is a schematic diagram for explaining a layout of elements of the light source device.

FIG. 7 is a schematic diagram for explaining a layout of the light source 10, the light receiving unit 18, the optical splitter 21, the converging lens 22, the mirror 23, and the coupling lens 11. As shown in FIG. 7, light beams (divergent light) emitted by the light source 10 are incident on the optical splitter 21. The optical splitter 21 splits the light beams into two light beams: one light beam passing though the opening 21a, which includes a principal ray (hereinafter, "scanning light beam"), and other light beam deflected by the deflecting surface of the optical splitter 21 around the opening 21a in the +X direction (hereinafter, "monitoring light beam"). The scanning light beam is substantially collimated by the coupling lens 11 and emitted to the aperture member 12. The monitoring light beam is converged by the converging lens 22 on the incident surface of the light receiving unit 18 via the mirror 23. The light beam emitted from one of the light emitters 10a of the light source 10 is shown in FIG. 7 as an example. The converging lens 22 is positioned such that a light beam from every light emitter 10a is incident on the light receiving unit 18.

Operations of the image forming apparatus 200 are explained below. Once the image forming apparatus 200 receives image information from an upper device, the optical scanning device 100 is driven with modulation data based on the image information. The light source device 70 emits 32 light beams modulated based on the image information. Of the light beams, scanning light beams are shaped by the aperture member 12 and converged on the deflecting surface of the polygon mirror 15 by the linear-image forming lens 13, so that the scanning light beams are deflected in the Y-axis direction. Thereafter, the scanning light beams are adjusted in scanning speed by the first scanning lens 16 and converged on the surface of the photosensitive drum 201 by the second scanning lens 17 via the mirror 19. On the other hand, the monitoring light beams are deflected toward the light receiving unit. A signal output from the light receiving unit 18 when the monitoring light beams are incident on the light receiving unit 18 is continuously monitored to control the amount of light output from the light source 10.

Specifically, the light receiving unit 18 receives the monitoring light beams during the time from when the scanning light beams are deflected on the deflecting surface of the polygon mirror 15 until the scanning light beams reach a writing area of the photosensitive drum 201. The intensity of the light beams emitted from the light source 10 is detected based on a photoelectrically-converted signal output from the light receiving unit 18. Power to be supplied to each of the light emitters 10a is set such that the intensity of the light beams is maintained at a predetermined value. Thus, the scanning light beam having an adjusted intensity is output from each light emitter 10a and incident on the writing area. The value of the power to be supplied to each light emitter 10a is maintained at the predetermined value until the scanning of the writing area is completed, and is reset before next scanning. In other words, for each scanning, the output of each light emitter 10a is adjusted. It is not necessary to set the value of the power for all the light emitters 10a. For example, the value of only one light emitter 10a can be set.

The photosensitive drum 201 has a photosensitive layer as its surface that is charged with a predetermined voltage, so that the surface is uniformly charged with a predetermined charge density. After the photosensitive drum 201 is scanned by light beams deflected by the polygon mirror 15, a portion of the photosensitive layer on which the light beams are focused becomes conductive and a potential thereof becomes zero. Thus, by scanning the photosensitive drum 201 rotating in the direction of the arrow shown in FIG. 1 with the light beams modulated based on the image information, an electrostatic latent image defined by a charge distribution is formed on the surface of the photosensitive drum 201.

After the electrostatic latent image is formed on the surface of the photosensitive drum 201, the developing roller of the toner cartridge 204 supplies toner from the toner container to the surface of the photosensitive drum 201. Because the developing roller of the toner cartridge 204 is charged with a voltage having a polarity opposite to that of the photosensitive drum 201, the toner adhered to the developing roller is charged to a polarity the same as that of the photosensitive drum 201. Thus, the toner does not adhere to a charged portion of the surface of the photosensitive drum 201, and adheres only to a scanned portion of the surface of the photosensitive drum 201, so that a toner image, i.e., a visible image of the electrostatic latent image, is formed thereon. The toner image is transferred onto the surface of the sheet 213 by the transfer charger 211 and fixed thereon by the fixing rollers 209, so that an image is formed on the surface of the sheet 213. The sheet 213 is ejected by the ejecting rollers 212 and stacked on the eject tray 210.

As explained above, the substrate 76, the first holder 74, and the second holder 72 are integrated and the light source 10, the light receiving unit 18, the optical splitter 21, the converging lens 22, the mirror 23, and the coupling lens 11 have a predetermined positional relationship. Therefore, even when the light source device 70 is rotated in a direction indicated by an arrow a or an arrow a' shown in FIG. 6B for adjusting the pitch of light beams in the sub scanning direction, the relative position of the light source 10, the light receiving unit 18, the optical splitter 21, the converging lens 22, the mirror 23, and the coupling lens 11 does not change, which keeps a state where a light beam is accurately incident on the light receiving unit 18. Thus, optical adjustment is unnecessary between the light source 10 and the light receiving unit 18, which shortens the time required for the adjustment of the light source device 70.

Because the optical splitter 21 is arranged between the light source 10 and the coupling lens 11, the size of the light source device 70 can be reduced compared to a case where the optical splitter 21 is arranged to a side (i.e., the −Y side) of the coupling lens 11 from which the light beam is emitted.

The optical splitter 21 splits light beams emitted from the light emitters 10a by allowing part of the light beams including the principal ray to pass through and by deflecting the rest of them. Thus, it is possible to scan the photosensitive drum 201 with the light beams including the principal ray, which has high intensity as well as monitoring the intensity of the light beams emitted from the light source 10 based on the light beams that are not used for scanning the photosensitive drum 201. This increases the efficiency of using the light beams. Because a center portion (the Gaussian distribution) of the light beams emitted from the light emitters 10a is used as the scanning light beams, the shape of the beam spot on the scan surface of the photosensitive drum 201 can be favorable. On the other hand, the shape of the beam spot on the incident surface of the light receiving unit 18 tends not to be uniform because peripheral light beams are used as the monitoring light beams. However, such a favorable shape is not required to the beam spot of the monitoring light beam, and it suffices that the scanning light beam have a minimum light amount that can be monitored.

The converging lens 22 is positioned such that the light beam from each light emitter 10a is incident on the light receiving unit 18. Thus, it is possible to set the value of each voltage to be supplied to each light emitter 10a. The position of the converging lens 22 with respect to the X axis, the Y axis, and the Z axis is adjusted such that each light emitter 10a and the incident surface of the light receiving unit 18 conjugate. The converging lens 22 is fixed to the first holder 74, using, for example, an adhesive agent. However, some other method can be employed to fix the converging lens 22 to the first holder 74.

Because both of the light source 10 and the light receiving unit 18 are mounted on the same substrate 76, no external wiring is required to electrically connect the light source 10 and the light receiving unit 18. Thus, effect of external noise can be reduced. In addition, the number of necessary parts can be reduced, which lowers the cost of the light source device 70.

Figure 8:
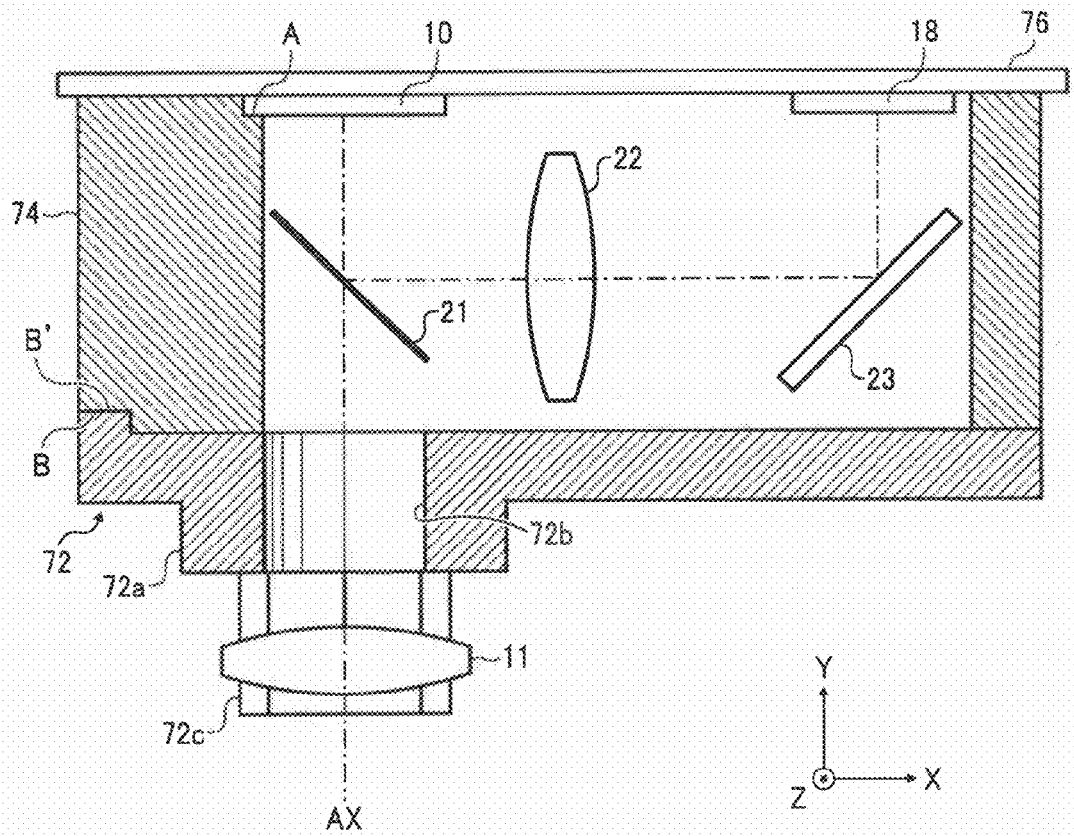
FIG. 8 is a cross-sectional view of the light source device shown in FIG. 3A.

The first holder 74 holds the light source 10 via the substrate 76 and the second holder 72 holds the coupling lens 11. For example, as shown in FIG. 8, a fitting portion A that is fit to a corner of the flat package of the light source 10 is formed in the first holder 74 and a fitting portion B and a fitting portion B' that fit to each other when the first holder 74 and the second holder 72 are connected is formed in the second holder 72. The fitting portion A, the fitting portion B, and the fitting portion B' help accurate positioning of the light source 10 and the lens supporting member 72c when the substrate 76, the first holder 74, and the second holder 72 are assembled. Alternatively, a positioning pin and a hole with which the positioning pin is engaged can be formed as a unit for positioning the first holder 74 and the second holder 72.

Figure 9:
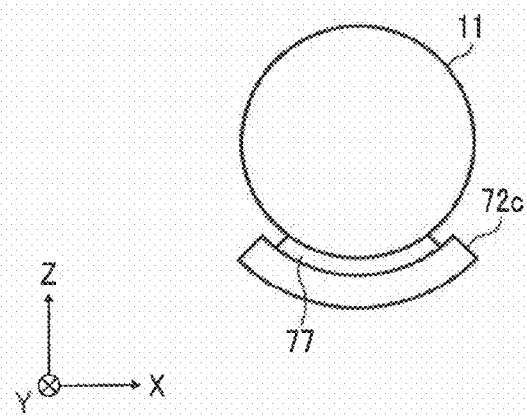
FIG. 9 is a front view of a coupling lens shown in FIG. 5.

As shown in FIG. 9, the upper surface of the lens supporting member 72c that supports the coupling lens 11 can be curved surface. In this case, an adhesive-agent layer 77 of a UV-curable adhesive agent with a thickness less than 300 micrometers is formed on the upper surface of the lens supporting member 72c. The coupling lens 11 is arranged on the adhesive-agent layer 77 while held by, for example, a pair of jigs from the +Z side and the −Z side. Subsequently, while the coupling lens 11 is moved in the X-axis direction, the Y-axis direction, and the Z-axis direction as well as being rotated with respect to each of the Z, Y, and Z axes via the jig, a focal point is detected by a knife edge method and the position of the optical axis AX of the coupling lens 11 shown in FIG. 8 is detected. In this manner, the relative position between the coupling lens 11 and the light source 10 is adjusted. After the adjustment, the ultraviolet (UV)-curable adhesive agent is cured by, for example, irradiating the UV-curable adhesive agent with UV light.

Thermal expansion of the adhesive-agent layer due to temperature change can change the relative position of the coupling lens 11 and the light source 10. Therefore, it is preferable that the adhesive-agent layer 77 is thin. If member error (assembling error) of, for example, the first holder 74, the second holder 72, or the coupling lens 11 is large, the adhesive-agent layer 77 may not be formed in a desired thickness. In such a case, the coupling lens 11 is not supported properly by the lens supporting member 72c, which interrupts the optical axis collimation adjustment.

The above inconvenience tends to occur when the light source 10 and the second holder 72 are inaccurately positioned. For this reason, as described above, by almost accurately positioning the light source 10 and the lens supporting member 72c when the substrate 76, the first holder 74, and the second holder 72 are assembled, it is possible to fix the coupling lens 11 to the lens supporting member 72c easily and highly accurately.

Figure 10:
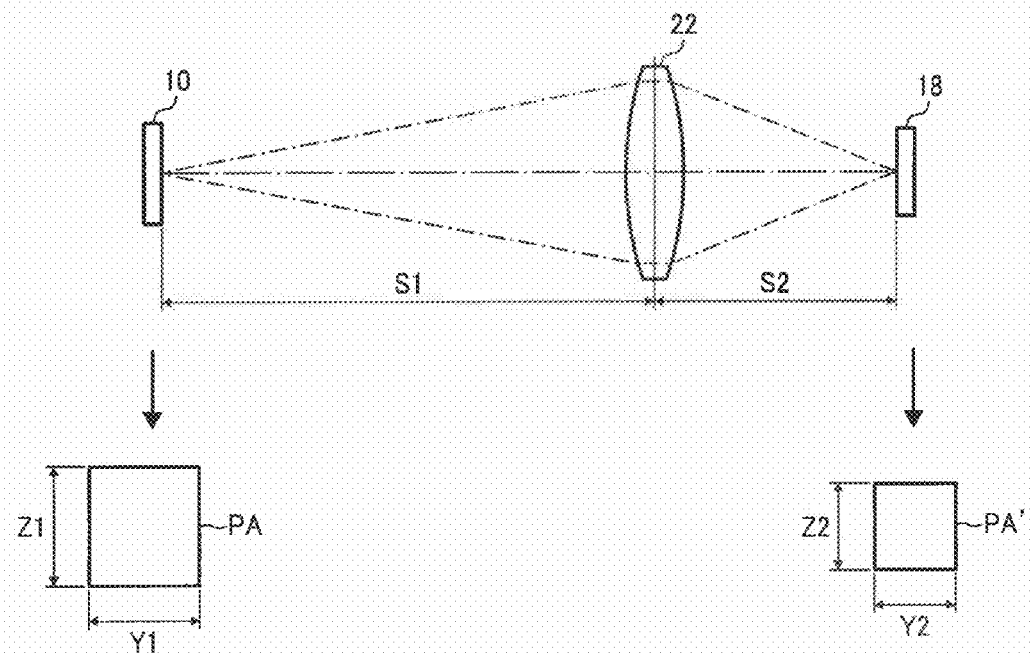
FIG. 10 is a schematic view for explaining a layout of the light source, a converging lens shown in FIG. 5, and a light receiving unit shown in FIG. 3B.

By employing a reducing optical system as the light guiding system 20, it is possible to downsize the light receiving unit 18. FIG. 10 is a schematic view for explaining a layout of the light source 10, the converging lens 22, and the light receiving unit 18. The size of an emitting area PA of the light source 10 shown in FIG. 10, which is defined by the light emitters 10a and the size of an irradiated area PA' of the light receiving unit 18 shown in FIG. 8, on which 32 light beams are incident, can be represented by Equations (1) and (2):

$$Y2 = Y1 \times (S2/S1) \quad (1)$$

$$Z2 = Z1 \times (S2/S1) \quad (2)$$

where Z1 and Z2 are lengths of the emitting area PA and the irradiated area PA' in the Z-axis direction and Y1 and Y2 are widths of the emitting area PA and the irradiated area PA' in the Y-axis direction.

In a reducing optical system, S1 is larger than S2, and thus, S2/S1 is less than 1. Thus, the irradiated area PA' is smaller than the emitting area PA. This makes it easier to converge the monitoring light beam on the light receiving unit 18, and thus, the light receiving unit 18 can be downsized, which results in cost reduction of the light source device 70. Furthermore, the use of the reducing optical system as the light receiving unit 18 leads to improvement in a response speed of the light receiving unit 18. The emitting area PA has a length in the main scanning direction (=Y1) of 210 micrometers and a width in the sub scanning direction (=Z1) of 71.3 micrometers. Because the light guiding system 20 is a reducing optical system, the irradiated area PA' has a length in the main scanning direction (=Y2) of less than 210 micrometers and a width in the sub scanning direction (=Z2) of less than 71.3 micrometers. The irradiated area PA' is large depending on the beam spot size (from 30 micrometers to 80 micrometers).

By arranging the converging lens 22 in a position close to the optical splitter 21, it is possible to reduce the diameter of the converging lens 22. Specifically, as shown in FIG. 7, a distance D2 from the optical splitter 21 to the converging lens 22 is shorter than a distance D1 from the optical splitter 21 to the coupling lens 11.

The converging lens 22 and the coupling lens 11 can have the same shape and the same refractivity. Because the portion of the light beam around the center portion is used as the monitoring light beam, it is usually required that the converging lens 22 be larger than that of the coupling lens 11. However, a different type of lens is unnecessary if the same types of lenses are used as the converging lens 22 and the coupling lens 11, which reduces the cost of the optical scanning device 100.

The optical scanning device 100 includes the aperture member 12 that shapes the scanning light beam having passed through the opening 21a. Thus, the light beams converged on the photosensitive drum 302 can have the same shape.

Because the image forming apparatus 200 includes the optical scanning device 100 in which optical adjustment is accurately performed, the image forming apparatus 200 can form a highly accurate image on a recording medium (the sheet 213) based on an electrostatic latent image formed by the optical scanning device 100.

In the embodiment, the light source device 70 and the optical scanning device 100 are applied to the image forming apparatus 200 that forms a single color image. However, the light source device 70 and the optical scanning device 100 can also be applied to a tandem-color image forming apparatus shown in FIG. 11. The tandem-color image forming apparatus shown in FIG. 11 includes a photosensitive drum K1, a charger K2, a developer K4, a cleaning unit K5, and a transfer charging unit K6, for black (K); a photosensitive drum C1, a charger C2, a developer C4, a cleaning unit C5, and a transfer charging unit C6, for cyan (C); a photosensitive drum M1, a charger M2, a developer M4, a cleaning unit M5, and a transfer charging unit M6, for magenta (M); a photosensitive drum Y1, a charger Y2, a developer Y4, a cleaning unit Y5, and a transfer charging unit Y6, for yellow (Y); an optical scanning device 900 that includes the light source device 70; a transfer belt 902; and a fixing uni901.

The light emitters of the light source 10 of the optical scanning device 900 are allocated for the corresponding colors (i.e., black, cyan, magenta, and yellow). The photosensitive drum K1 is irradiated with a light beam from the light emitter for black, the photosensitive drum C1 is irradiated with a light beam from the light emitter for cyan, the photosensitive drum M1 is irradiated with a light beam from the light emitter for magenta, and the photosensitive drum Y1 is irradiated with a light beam from the light emitter for yellow. Furthermore, the image forming apparatus shown in FIG. 11 can includes a plurality of optical scanning devices respectively for black, cyan, magenta, and yellow.

Figure 11:
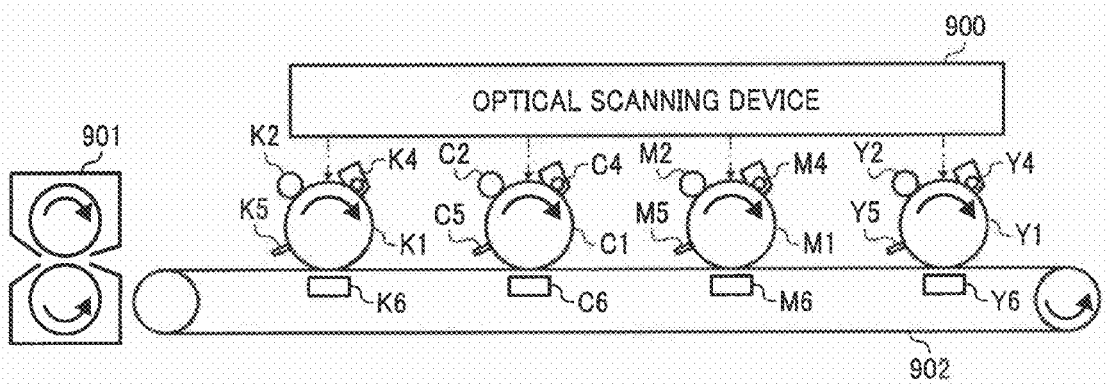
FIG. 11 is a schematic diagram of a typical color image forming apparatus.

The photosensitive drums K1, C1, M1, and Y1 rotate respectively in the directions indicated by arrows shown in FIG. 11. As shown in FIG. 11, a charger, a developer, a transfer charger, and a cleaning unit are arranged around each of the photosensitive drums K1, C1, M1, and Y1. The chargers K2, C2, M2, and Y2 charge the respective surfaces of the photosensitive drums K1, C1, M1, and Y1. The optical scanning device 900 applies the light fluxes to the surfaces of the photosensitive drums K1, C1, M1, and Y1, and thus, electrostatic latent images are formed on the surfaces of the photosensitive drums K1, C1, M1, and Y1. The developers develop the electrostatic latent images, so that toner images are formed on the surfaces. The transfer chargers K6, C6, M6, and Y6 transfer the toner images from the surfaces of the photosensitive drums K1, C1, M1, and Y1 onto a recording medium in a superimposed manner. An unfixed toner image thus obtained on the recording medium is fixed thereon by the fixing unit 30.

The optical scanning device 100 can be applied to an image forming apparatus other than printers, such as a copier, a facsimile machine, or a multifunction product (MFP).

According to an aspect of the present invention, it is unnecessary to perform optical adjustment between the light source and the light receiving unit. Thus, it is possible to accurately adjust the light source device in a short time.

According to another aspect of the present invention, it is possible to form an image on a recording medium with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device, comprising:
    a light source that emits a light beam;
    an optical splitting member that splits the light beam into a first light beam and a second light beam;
    a coupling member that couples the first light beam;
    a light receiving unit;
    an optical system including a converging member that converges the second light beam on the light receiving unit;
    a holding member that holds the light source, the optical splitting member, the coupling member, and the optical system in a predetermined relation; and
    a supporting member that supports the holding member such that the holding member is rotatable about an optical axis of the light beam.

2. The light source device according to claim 1, wherein the optical splitting member has a reflecting portion that reflects the second light beam and a though portion through which the first light beam passes.

3. The light source device according to claim 1, wherein the converging member is arranged such that the second light beam is incident on the light receiving element.

4. The light source device according to claim 1, further comprising a substrate on which the light source and the light receiving unit are mounted.

5. The light source device according to claim 1, wherein the holding member includes a first holding member having a first surface and a second holding member having a second surface, the first surface and the second surface being in contact with each other and perpendicular to the optical axis of the light beam,
    the first holding member holds the light source, the optical splitting member, the light receiving unit, and the optical system, and
    the second holding member holds the coupling member.

6. The light source device according to claim 5, wherein the light source is mounted on a package, and
    the first holding member includes a positioning member that is in contact with a circumference of the package, so that a position of the light source along the optical axis of the light beam is determined.

7. The light source device according to claim 5, wherein the first holding member and the second holding member each include a positioning member that positions the first holding member and the second holding member along the optical axis of the light beam.

8. The light source device according to claim 1, wherein the optical system is a reducing optical system.

9. The light source device according to claim 1, wherein a distance between the optical splitting member and the converging member is shorter than a distance between the optical splitting member and the coupling member.

10. The light source device according to claim 1, wherein the coupling member and the converging member are lenses having an identical shape and equal refractivity.

11. An optical scanning device comprising:
    a light source including
        a light source that emits a light beam;
        an optical splitting member that splits the light beam into a first light beam and a second light beam;
        a coupling member that couples the first light beam;
        a light receiving unit;
        an optical system including a converging member that converges the second light beam on the light receiving unit;
        a holding member that holds the light source, the optical splitting member, the coupling member, and the optical system in a predetermined relation; and
        a supporting member that supports the holding member such that the holding member is rotatable about an optical axis of the light beam;
    a deflecting unit that deflects the first light beam; and
    an optical scanning system that focuses the first light beam deflected by the deflecting unit on a scan target surface.

12. The optical scanning device according to claim 11, further comprising an aperture member arranged between the light source and the deflecting unit that shapes the first light beam.

13. An image forming apparatus comprising:
    the optical scanning device according to claim 11;
    a photosensitive member having the surface on which an electrostatic latent image is formed by the optical scanning device based on information on an image;
    a developing unit that develops the electrostatic latent image into a visible toner image; and
    a transfer unit that transfers the visible toner image from the surface of the photosensitive member onto a recording medium and fixes the visible toner image on the recording medium.

14. An image forming apparatus comprising:
    the optical scanning device according to claim 11;
    a photosensitive member corresponding to each of a plurality of colors, each of the photosensitive members having a surface on which an electrostatic latent image of a corresponding color is formed by the optical scanning device based on information on an image;
    a developing unit corresponding to each of the photosensitive members and that develops an electrostatic latent image on a surface of a corresponding photosensitive member into a toner image; and
    a transfer unit corresponding to each of the photosensitive members and that transfers a toner image from a surface of a corresponding photosensitive member onto a recording medium and fixes the toner images on the recording medium.

* * * * *